US011797633B2

(12) United States Patent
Yucra Rodriguez et al.

(10) Patent No.: US 11,797,633 B2
(45) Date of Patent: *Oct. 24, 2023

(54) METHODS AND SYSTEMS FOR REDIRECTING A USER FROM A THIRD PARTY WEBSITE TO A PROVIDER WEBSITE

(71) Applicant: Capital One Services, LLC, McLean, VA (US)

(72) Inventors: Jonatan Yucra Rodriguez, San Francisco, CA (US); Jose Moreno, Berkeley, CA (US); Andrew Veenstra, San Francisco, CA (US); Vu Nguyen, Pittsburg, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,028

(22) Filed: Aug. 8, 2022

(65) Prior Publication Data

US 2022/0385743 A1 Dec. 1, 2022

Related U.S. Application Data

(63) Continuation of application No. 17/128,334, filed on Dec. 21, 2020, now Pat. No. 11,409,829.

(51) Int. Cl.
*G06F 16/954* (2019.01)
*G06F 16/955* (2019.01)
(Continued)

(52) U.S. Cl.
CPC ........ *G06F 16/954* (2019.01); *G06F 16/9558* (2019.01); *G06F 16/986* (2019.01);
(Continued)

(58) Field of Classification Search
CPC .... G06F 16/95; G06F 16/954; G06F 16/9558; G06F 16/986; G06F 40/134;
(Continued)

(56) References Cited

U.S. PATENT DOCUMENTS 7,426,543 B2 9/2008 Pfitzner
7,953,671 B2 5/2011 Bishop et al.
(Continued)

OTHER PUBLICATIONS

Extended European Search Report dated May 23, 2022 for European Application No. 21214546.0 (11 pages).
(Continued)

*Primary Examiner* — Andrew R Dyer
(74) *Attorney, Agent, or Firm* — Bookoff McAndrews, PLLC

(57) ABSTRACT

Disclosed are methods, systems, and non-transitory computer-readable medium for redirecting a user. For instance, the method may include: determining whether a there is a presence of one or combinations of: a particular webpage of a third party website and particular DOM element(s); performing a first DOM analysis on the particular webpage to extract an entity and first data from at least one of the particular DOM element(s); determining whether an entity website is mapped based on the entity and a mapping of entities to entity websites; performing a navigation process to interact with the entity website and extract second data; and performing a comparison analysis on the first data and the second data to determine whether at least one difference is present.

20 Claims, 8 Drawing Sheets

(51) Int. Cl.
   *G06F 16/958* (2019.01)
   *G06F 40/134* (2020.01)
   *G06F 40/194* (2020.01)
   *G06F 40/279* (2020.01)
   *G06F 40/221* (2020.01)
   *H04L 67/63* (2022.01)
   *H04L 67/02* (2022.01)
   *G06F 3/0482* (2013.01)

(52) U.S. Cl.
   CPC .......... *G06F 40/134* (2020.01); *G06F 40/194* (2020.01); *G06F 40/221* (2020.01); *G06F 40/279* (2020.01); *H04L 67/02* (2013.01); *H04L 67/63* (2022.05); *G06F 3/0482* (2013.01)

(58) Field of Classification Search
   CPC .... G06F 40/194; G06F 40/221; G06F 40/279; G06F 3/0482; H04L 67/02; H04L 67/63; G06Q 30/0282; G06Q 30/0601; G06Q 50/12
   USPC .......................................... 715/205
   See application file for complete search history.

(56) References Cited

U.S. PATENT DOCUMENTS

| | | | | |
|---|---|---|---|---|
| 8,458,010 | B1* | 6/2013 | Geoffrin | G06Q 30/0238 705/7.29 |
| 8,595,050 | B2* | 11/2013 | Scotto | G06Q 10/04 705/7.29 |
| 9,408,182 | B1 | 8/2016 | Hurley et al. | |
| 10,380,576 | B1* | 8/2019 | Yachin | G06Q 30/0623 |
| 10,452,736 | B1* | 10/2019 | Nguyen | G06F 21/41 |
| 10,586,244 | B2 | 3/2020 | Shiffert et al. | |
| 10,616,255 | B1* | 4/2020 | Strauss | H04L 63/10 |
| 2005/0228890 | A1* | 10/2005 | Lawrence | G06F 3/0481 709/227 |
| 2006/0026231 | A1 | 8/2006 | Degenhardt et al. | |
| 2008/0098300 | A1 | 4/2008 | Corrales et al. | |
| 2010/0146077 | A1 | 6/2010 | Davies et al. | |
| 2011/0314122 | A1 | 12/2011 | Shyamkumar et al. | |
| 2012/0204088 | A1 | 8/2012 | Bennett et al. | |
| 2013/0124756 | A1 | 5/2013 | Voronel et al. | |
| 2013/0185155 | A1 | 7/2013 | Colando | |
| 2013/0238465 | A1* | 9/2013 | Calixte-Civil | G06Q 30/02 705/26.41 |
| 2014/0046794 | A1 | 2/2014 | Vallery et al. | |
| 2014/0052571 | A1 | 2/2014 | Raman | |
| 2014/0279222 | A1 | 9/2014 | Lampert | |
| 2015/0032538 | A1 | 1/2015 | Calman et al. | |
| 2015/0046243 | A1 | 2/2015 | Ricci | |
| 2015/0112836 | A1 | 4/2015 | Godsey et al. | |
| 2015/0363793 | A1 | 12/2015 | Lam | |
| 2015/0379554 | A1 | 12/2015 | Copeland | |
| 2016/0055256 | A1 | 2/2016 | Look et al. | |
| 2016/0117398 | A1 | 4/2016 | Dakua | |
| 2016/0180436 | A1 | 6/2016 | Arana | |
| 2016/0275092 | A1 | 9/2016 | Black et al. | |
| 2016/0350842 | A1 | 12/2016 | Glass et al. | |
| 2017/0098264 | A1* | 4/2017 | Priebatsch | H04L 67/52 |
| 2017/0131884 | A1 | 5/2017 | Jeon et al. | |
| 2017/0193583 | A1 | 7/2017 | Godsey et al. | |
| 2018/0039530 | A1 | 2/2018 | Ciabarra, Jr. et al. | |
| 2018/0048673 | A1 | 2/2018 | Hunt et al. | |
| 2018/0268383 | A1 | 9/2018 | Kim et al. | |
| 2019/0103101 | A1* | 4/2019 | Danila | G10L 25/51 |
| 2019/0205971 | A1* | 7/2019 | Deo | G06Q 30/0641 |
| 2019/0392503 | A1 | 12/2019 | Corrieri et al. | |
| 2020/0004798 | A1 | 1/2020 | Weinert, Jr. et al. | |
| 2020/0082425 | A1 | 3/2020 | Corrieri et al. | |
| 2020/0160428 | A1* | 5/2020 | Calvo | G06Q 30/0633 |
| 2020/0334688 | A1* | 10/2020 | Trujillo | G06Q 30/018 |
| 2020/0382464 | A1* | 12/2020 | Keller | H04W 4/12 |
| 2021/0019813 | A1 | 1/2021 | Ferguson et al. | |
| 2021/0105289 | A1* | 4/2021 | Desai | H04L 63/1416 |
| 2021/0201286 | A1* | 7/2021 | Panigrahi | G06Q 20/209 |

OTHER PUBLICATIONS

Nicole Cozma; Use ShopGenius for Chrome to find the best prices online; Aug. 19, 2013; cnet.com; pp. 1-6.

Tali Garsiel and Paul Irish; How Browsers Work: Behind the scenes of modern web browsers; Aug. 5, 2011; HTML5 Rocks; pp. 1-52.

* cited by examiner

METHODS AND SYSTEMS FOR REDIRECTING A USER FROM A THIRD PARTY WEBSITE TO A PROVIDER WEBSITE

CROSS-REFERENCE TO RELATED APPLICATION(S)

This patent application is a continuation of, and claims the benefit of priority to, U.S. Nonprovisional patent application Ser. No. 17/128,334, filed on Dec. 21, 2020, the entirety of which is incorporated herein by reference.

TECHNICAL FIELD

Various embodiments of the present disclosure relate generally to methods and systems for redirecting a user and, more particularly, to methods and systems for redirecting a user from a third party website to a provider website.

BACKGROUND

Third party websites (e.g., websites associated with courier delivery services such as food delivery services for restaurants) may demand more resources from a user for certain services compared to the resources demanded by the provider website (e.g., websites associated with the restaurants) for the same services. Accordingly, there is a need for methods and systems for redirecting a user from a certain third party website when advantageous for the user.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for redirecting a user. For instance, a method may include determining whether a trigger condition is satisfied, the trigger condition being a presence of one or combinations of: a particular webpage of a third party website and particular DOM element(s); in response to the trigger condition being satisfied, performing a first DOM analysis on the particular webpage to extract an entity and first data from at least one of the particular DOM element(s); determining whether an entity website is mapped based on the entity and a mapping of entities to entity websites; in response to determining the entity website is mapped, performing a navigation process to interact with the entity website by: interacting with the entity website to navigate to a particular entity webpage, and performing a second DOM analysis on the particular entity webpage to extract second data from DOM element(s) of the particular entity webpage corresponding to the at least one of the particular DOM element(s); performing a comparison analysis on the first data and the second data to determine whether at least one difference is present; and in response to determining the at least one difference is present, displaying a menu, the menu including a summary of the at least one difference and a link to the entity website or the particular entity webpage.

A system may include a memory storing instructions; and a processor executing the instructions to perform a process. The process may include monitoring a browser session of a user; determining whether the user is interacting with a third party website based on the monitoring; in response to determining the user is interacting with the third party website, determining whether a trigger condition is satisfied, the trigger condition being a presence of one or combinations of: a particular webpage and particular DOM element(s); in response to the trigger condition being satisfied, performing a first DOM analysis on the particular webpage to extract an entity and first data from at least one of the particular DOM element(s); determining whether an entity website is mapped based on the entity and a mapping of entities to entity websites; in response to determining the entity website is mapped, performing a navigation process to interact with the entity website by: interacting with the entity website to navigate to a particular entity webpage, and performing a second DOM analysis on the particular entity webpage to extract second data from DOM element(s) of the particular entity webpage corresponding to the at least one of the particular DOM element(s); performing a comparison analysis on the first data and the second data to determine whether at least one difference is present; and in response to determining the at least one difference is present, displaying a menu, the menu including a summary of the at least one difference and a link to the entity website or the particular entity webpage.

A non-transitory computer-readable medium may store instructions that, when executed by a processor, cause the processor to perform a method. The method may include: monitoring a browser session of a user; determining whether the user is interacting with a third party website based on the monitoring; in response to determining the user is interacting with the third party website, determining whether a trigger condition is satisfied, the trigger condition being a presence of one or combinations of: a particular webpage and particular DOM element(s); in response to the trigger condition being satisfied, performing a first DOM analysis on the particular webpage to extract an entity and first data from at least one of the particular DOM element(s); determining whether the first data includes a first value for a first data type or a second value for a second data type; in response to determining the first data includes the first value for the first data type, determining whether the first value is greater than a first threshold; in response to determining the first data includes the second value for the second data type, determining whether the second value is greater than a second threshold; in response to determining the first value is greater than the first threshold and/or the second value is greater than the second threshold, determining whether an entity website is mapped based on the entity and a mapping of entities to entity websites; in response to determining the entity website is mapped, performing a navigation process to interact with the entity website by: interacting with the entity website to navigate to a particular entity webpage, and performing a second DOM analysis on the particular entity webpage to extract second data from DOM element(s) of the particular entity webpage corresponding to the at least one of the particular DOM element(s); performing a comparison analysis on the first data and the second data to determine whether at least one difference is present; and in response to determining the at least one difference is present, displaying a menu, the menu including a summary of the at least one difference and a link to the entity website or the particular entity webpage.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
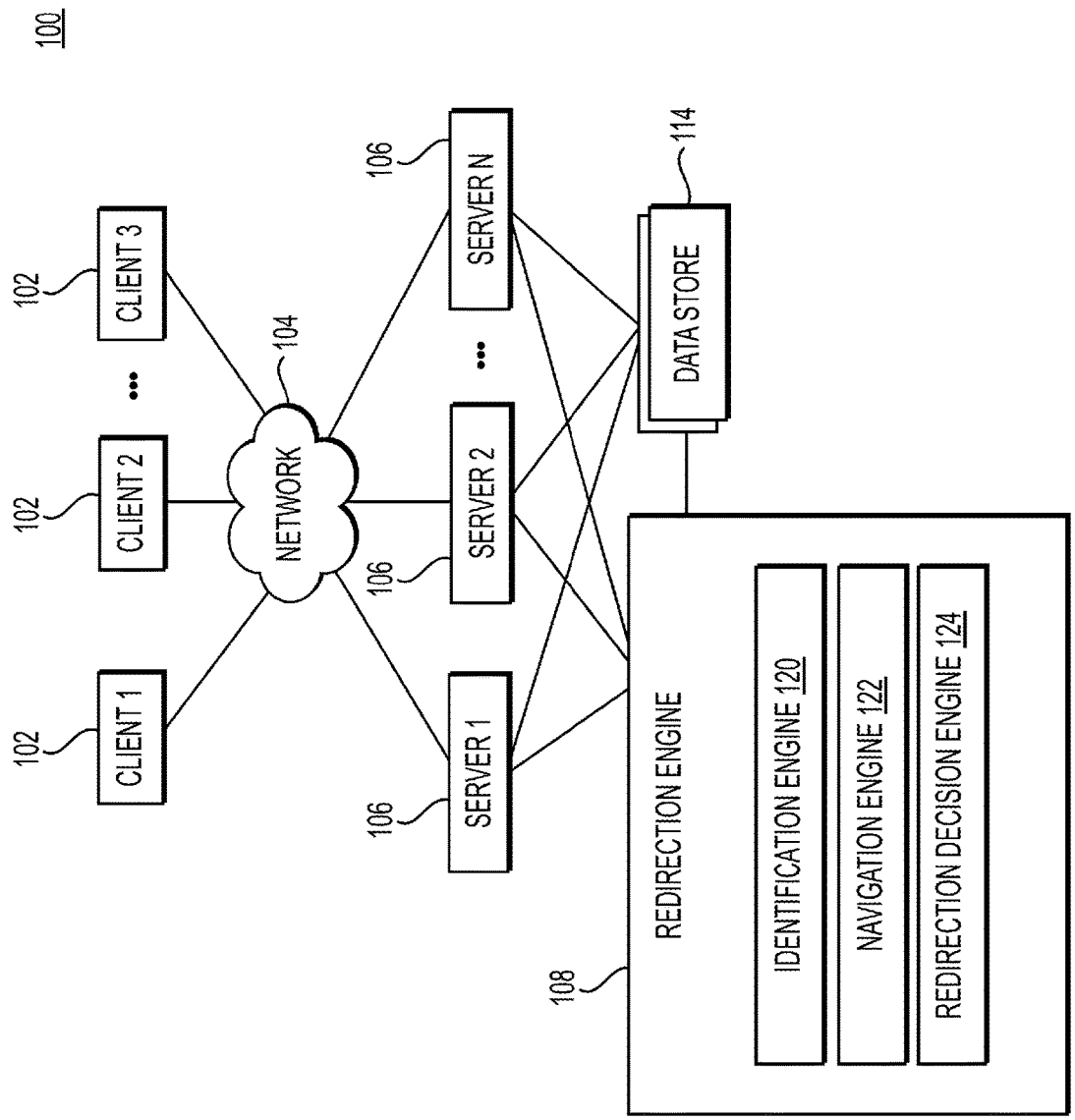
FIG. 1 depicts an exemplary block diagram of a system for redirecting a user, according to one or more embodiments.

Various embodiments of the present disclosure relate generally to methods and systems for redirecting a user.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Third party websites (e.g., websites associated with courier delivery services such as food delivery services for restaurants) may demand more resources from a user for certain services compared to the resources demanded by the provider website (e.g., websites associated with the restaurants) for the same services. For example, food delivery services may charge a customer double or triple the resources (e.g., fees) for delivery services depending on the time of day. In contrast, the demanded resources for the same delivery services directly from the provider website may be consistent throughout the day. Accordingly, there is a need for methods and systems for redirecting a user from a certain third party website when advantageous for the user. With conventional systems and methods, a user has to manually check and compare the third party website to the provider website in order to determine which is more advantageous for the user.

The techniques disclosed in the present disclosure address one or more of the above challenges. In general, the present disclosure is directed to methods and systems for redirecting a user from a third party website to a provider website. Some embodiments are directed to a redirection engine configured to determine whether the user is interacting with a third party website providing, for example, any type of courier delivery service (e.g., a food delivery service website). In some embodiments, the redirection engine may be implemented as a browser extension, as will be described in further detail below. The redirection engine may recognize when the user is on a resource submission page (e.g., a checkout page) and determine one or more values associated with resources being charged to the user (e.g., delivery charge and/or service charge). In some embodiments, the redirection engine may determine the one or more values based on one or more document object model (DOM) elements. Additionally, the redirection engine may determine the provider being displayed on the resource submission page based on one or more DOM elements. For example, the redirection engine may determine from which provider (e.g., restaurant) the user is planning to submit a request for the third party to deliver products (e.g., food). In the context of the current disclosure, DOM refers to a cross-platform (e.g., cross-browser) and language-independent convention for representing and interacting with objects and elements in Hypertext Markup Language (HTML), Extensible-Hypertext Markup Language (XHTML), and Extensible Markup Language (XML) documents. It is understood that objects and elements in a DOM may be addressed or manipulated using methods on the objects and elements and such methods may be defined in (e.g., embedded in) the HTML, XHTML, or XML document of the DOM being addressed or manipulated.

Upon determination of the provider, the redirection engine may further determine whether the provider is associated with one or more domains. In other words, the redirection engine may determine whether there is a website associated with the provider (hereinafter referred to as provider website). If an associated provider website is identified, the redirection engine may perform a navigation process on the provider website, as will be described in further detail below. In some embodiments, the redirection engine may navigate the provider website to arrive at the corresponding resource submission page and determine one or more values associated with the resources that may be charged to the user based on information (e.g., item information, address information, and/or payment information) provided by the user on the third party webpage. The redirection engine may then compare the one or more values to determine whether redirecting the user from the third party website to the provider website is indeed advantageous for the user.

Referring now to the figures, FIG. 1 shows a block diagram of an exemplary electronic communications system 100 for implementing embodiments of the present disclosure (e.g., for redirecting a user), or aspects thereof. In some embodiments, the system 100 may include clients 102, servers 106, data store 114, and redirection engine 108, all connected via network 104. System 100 may include one or more clients 102 (e.g., Client 1, Client 2, . . . Client M).

Clients 102 may be implemented with devices, and/or applications running thereon. By way of example, clients 102 may be a computing device consistent with or similar to that depicted in FIG. 4, including personal computers, laptops, tablet computers, personal digital assistants, mobile telephones, smartphones, pagers, and/or other types of electronic communication devices. Clients 102 may be configured to communicate with other entities in the system 100 via the network 104. In certain embodiments, network 104 may include any combination of communications networks. For example, network 104 may include the Internet and/or another type of wide area network, an intranet, a metropolitan area network, a local area network, a wireless network, a cellular communications network, etc. In some embodiments, clients 102 may be configured to initiate electronic transaction requests. For example, electronic transaction requests may include receiving or initiating electronic transactions with a third party service website and/or a provider website, etc. The electronic transaction requests may be generated by clients 102 and transmitted through network 104 to appropriate servers, such as, for example, servers 106.

Servers 106 may include one or more servers (e.g., Server 1, Server 2, . . . Server N) configured to interact with the network 104, one or more data stores 114, and the redirection engine 108. In addition, consistent with some embodiments, servers 106 may be implemented as a single server, a server system comprising a plurality of servers, or a server farm comprising a load balancing system and a plurality of servers.

Servers 106 may be hardware, software, or a combination thereof. In some embodiments, a product and/or service may be provided to the client 102 via the servers 106. For example, the servers 106 may be electronic transactions platforms.

As shown in FIG. 1, the redirection engine 108 may include an identification engine 120, a navigation engine 122, and a redirection decision engine 124 according to some embodiments. In some embodiments, the redirection engine 108 may be embodied in one or more combinations of hardware, software, and/or firmware. For example, the redirection engine 108 may be a part of a software application that is installed on any computing device consistent with or similar to that depicted in FIG. 4. In some embodiments, the redirection engine 108 may comprise a browser extension (also referred to as a plugin) configured to redirect a user, as will be described in further detail below.

In some embodiments, the identification engine 120 may be configured to perform DOM analysis on one or more webpages to extract information. In some embodiments, performing a DOM analysis on a webpage to extract information may include obtaining a webpage document for the webpage; parsing the webpage document to extract CSS elements and HTML elements; determining whether the CSS elements or the HTML elements include one or more DOM elements that include a relevant term; and extracting information from the one or more DOM elements in response to determining the CSS elements or the HTML elements include the one or more DOM elements.

In some embodiments, the navigation engine 122 may be configured to perform a navigation process on a particular website. The navigation engine 122 may be configured to utilize an inline frame (also referred to as an iframe) to perform the navigation process, as will be described in further detail below. In some embodiments, the redirection decision engine 124 may be configured to determine whether it is advantageous to the user to redirect the user from a third party website to a provider website based on the information extracted by the identification engine 120 and the navigation engine 122, as will be described in further detail below.

Figure 2A:
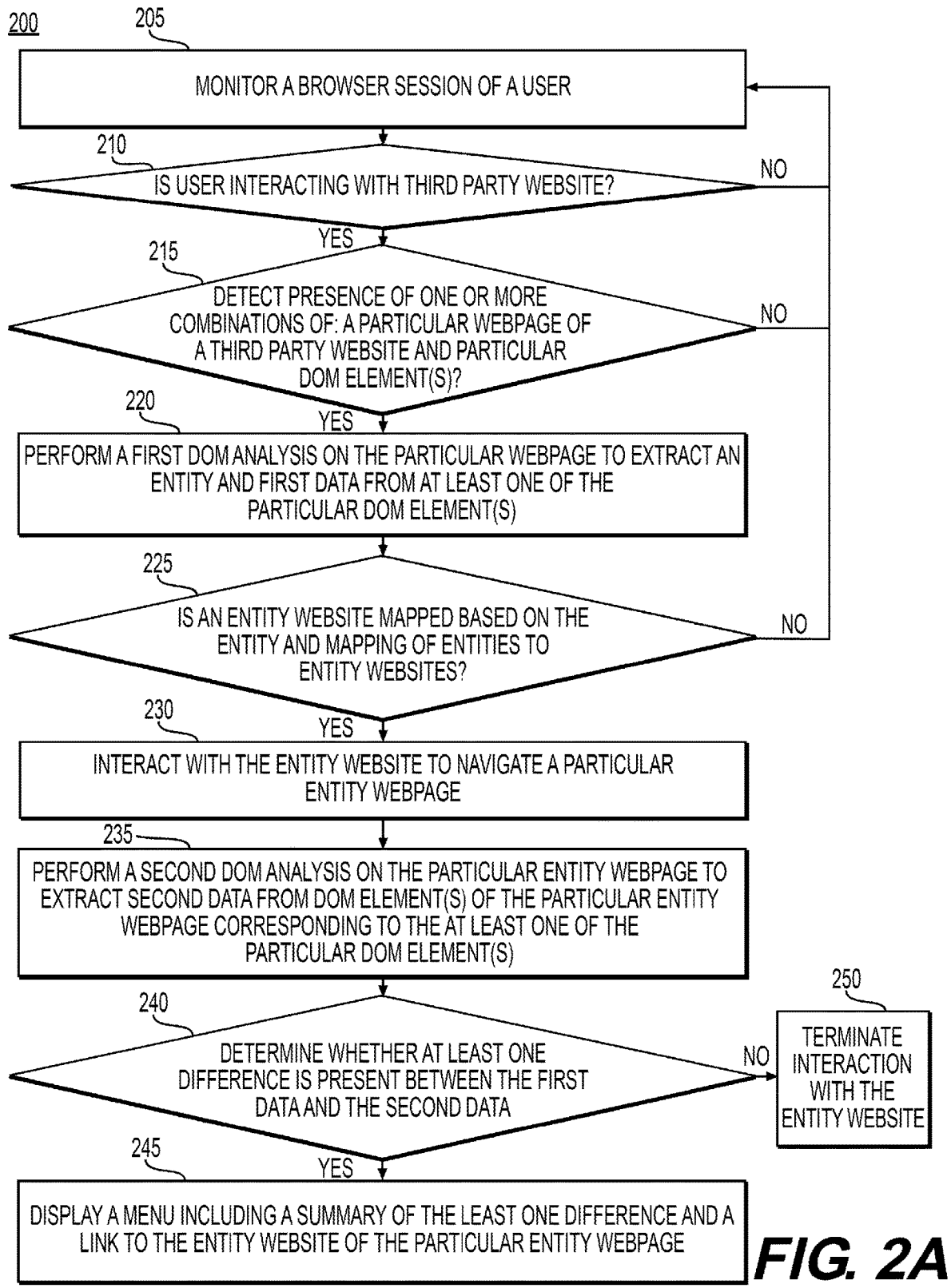
FIGS. 2A-2B depict flowcharts of methods for redirecting a user, according to one or more embodiments.
Figure 2B:
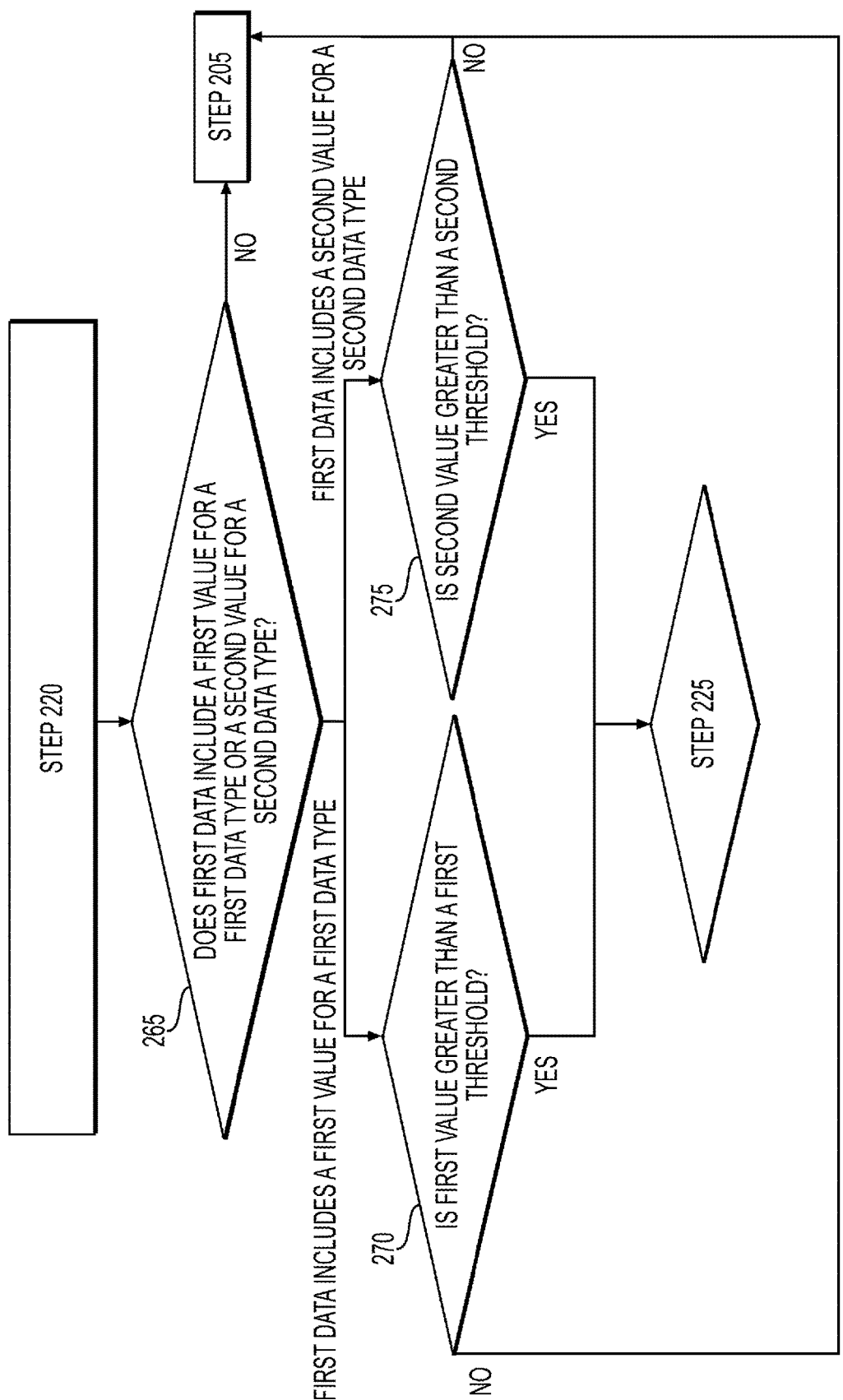

FIGS. 2A-2B depicts a flowchart of a method 200 for redirecting a user (e.g., client 102), according to one or more embodiments. For ease of explanation, method 200 will be described with reference to FIGS. 3A-3D, each of which depicts a GUI 300A, 300B, 300C, 300D configured to redirect a user according to one or more embodiments.

Figure 3A:
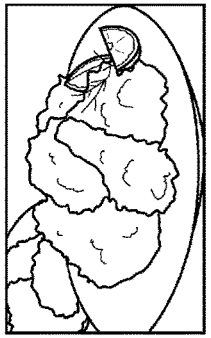
FIGS. 3A-3D depict GUIs for redirecting a user, according to one or more embodiments.

As shown in FIG. 2A, method 200 may begin with step 205 in which the redirection engine 108 may monitor a browser session of the user. In step 210, the redirection engine 108 may determine whether the user is interacting with a third party website based on the monitoring. In some embodiments, the redirection engine 108 may determine whether the user is interacting with one of a plurality of predetermined third party websites. In some embodiments, the predetermined third party websites may be stored, for example, in data store 114. For example, the redirection engine 108 may determine whether the user is interacting with a third party website based on at least a portion of a Uniform Resource Locator (URL 304) (e.g., Exemplarydeliveryservice_ExampleEats.com/checkout) as shown in FIG. 3A. In such instances, the redirection engine 108 may determine that the user is interacting with a website associated with Example Eats 302. The redirection engine 108 may determine whether Example Eats 302 is listed as one of the predetermined third party websites. Example Eats 302 is being used as an exemplary food delivery service simply for the purpose of explanation, and it is understood that the embodiments disclosed herein may be applied to any type of third party service. In some embodiments, the redirection engine 108 may parse the webpage to determine whether the user is interacting with a predetermined third party website. For example, the redirection engine 108 may identify a DOM element that indicates the third party service (e.g., Example Eats 302) associated with the webpage.

If the redirection engine 108 determines that the user is not interacting with a third party website, then the method 200 continues to monitor the browser session as shown in step 205.

If the redirection engine 108 determines that the user is interacting with a third party website, the method 200 moves on to step 215 in which the redirection engine 108 determines whether a trigger condition is satisfied. In some embodiments, the trigger condition may be the presence of one or combinations of: a particular webpage of a third party website and particular DOM element(s). Referring back to the example depicted in FIG. 3A, once the redirection engine 108 determines that the user is interacting with a website associated with Example Eats 302, the redirection engine may determine whether the user is interacting with a particular webpage of the website and determine whether a particular DOM element is being displayed to the user. For example, the redirection engine may determine whether the user is interacting with the resource submission (e.g., place order or checkout) webpage of the third party website. In some instances, the redirection engine 108 may determine that the user is interacting with the resource submission webpage based on at least a portion of the URL 304 (e.g., "checkout" portion of the URL 304). Additionally, or alternatively, the redirection engine 108 may perform a DOM analysis on the webpage to determine whether a DOM element includes one or more terms associated with finalizing resource submission (e.g., place order 306).

If the redirection engine 108 determines that the trigger condition is not satisfied, the redirection engine 108 continues to monitor the browser session as shown in step 205.

If the redirection engine 108 determines that the trigger condition is satisfied, the method 200 moves on to step 220 in which the redirection engine 108 may perform a first DOM analysis on the particular webpage to extract an entity and first data from at least one of the particular DOM element(s). Again referring to the example depicted in FIG. 3A, if the redirection engine 108 determines that the user is interacting with the resource submission webpage on the third party website and that a DOM element include one or more terms associated with finalizing resource submission (e.g., place order 306), the redirection engine 108 may perform a first DOM analysis to extract an entity name associated with the order and the order details. For example, the redirection engine 108 may perform the first DOM analysis to extract an entity (e.g., Golden Chicken 312) from which the third party service (e.g., Example Eats 302) may be delivering food. Golden Chicken 312 is being used as an exemplary provider simply for the purpose of explanation, and it is understood that the embodiments disclosed herein may be applied to any appropriate merchant (e.g., restaurants, flower shops, etc.). Additionally, the extracted order details may include a first type of charge 310A and a first charged amount 310B and/or a second type of charge 320A and a second charged amount 320B. In some embodiments, performing the first DOM analysis on the particular webpage to extract the entity may include: obtaining a webpage document for the particular webpage; parsing the webpage document to extract CSS elements and HTML elements; determining whether the CSS elements or the HTML elements include one or more DOM elements that include a keyword of a plurality of keywords or a known entity term of a plurality of known entity terms; and extracting from the one or more DOM elements the entity in response to determining the CSS elements or the HTML elements include the one or more DOM elements.

In some embodiments, performing the first DOM analysis on the particular webpage to extract the first data from the at least one of the particular DOM element(s) may include: determining whether the CSS elements or the HTML elements include one or more DOM element types of a plurality of DOM element types; and extracting the first data from DOM elements that correspond to the one or more DOM element types in response to determining the CSS elements or the HTML elements include the one or more DOM element types.

In some embodiments, method 200 may include additional steps 265-275 after performing the first DOM analysis (step 220) as shown in FIG. 2B. As shown in FIG. 2B, the redirection engine 108 may determine whether the first data includes a first value (e.g., first charged amount 310B) for a first data type (e.g., 310A) or a second value (e.g., second charged amount 320B) for a second data type (e.g., 310A) in step 265. If the redirection engine 108 determines that the first data does not include a first value for a first data type or a second value for a second data type, the redirection engine 108 may continue to monitor the browser session as shown in step 205. In step 270, the redirection engine 108 may determine whether the first value is greater than a first threshold in response to determining the first data includes the first value for the first data type. For example, the first threshold may be zero. In such instances, the redirection engine 108 may determine whether the first value is greater than zero. In step 275, the redirection engine 108 may determine whether the second value is greater than a second threshold in response to determining the first data includes the second value for the second data type. Similarly, the second threshold may also be zero and the redirection engine may determine whether the second value is greater than zero. As shown in FIG. 2B, the redirection engine 108 may perform step 225 in response to determining the first value is greater than the first threshold and/or the second value is greater than the second threshold. It is understood that each of the first and second thresholds may be any predetermined value in alternative embodiments. If the redirection engine 108 determines that the first value and the second value (if the second value is available) fall below each respective threshold in steps 270 and/or 275, the redirection engine 108 may continue to monitor the browser session as shown in step 205.

In step 225, the redirection engine 108 may determine whether an entity website is mapped based on the entity and a mapping of entities to entity websites. For example, the redirection engine 108 may determine whether a website associated with the extracted entity (e.g., Golden Chicken) exists at least based on the mapping of entities to entity websites. In some embodiments, determining whether the entity website is mapped based on the entity and the mapping of the entities to the entity websites may include: obtaining the mapping of the entities to the entity websites; determining whether the entity matches one of the entities; and determining a corresponding entity website to the one of the entities as the entity website in response to determining the entity matches the one of the entities. If the redirection engine 108 determines that the entity website is not mapped, the redirection engine 108 continues to monitor the browser session as shown in step 205.

Figure 3B:
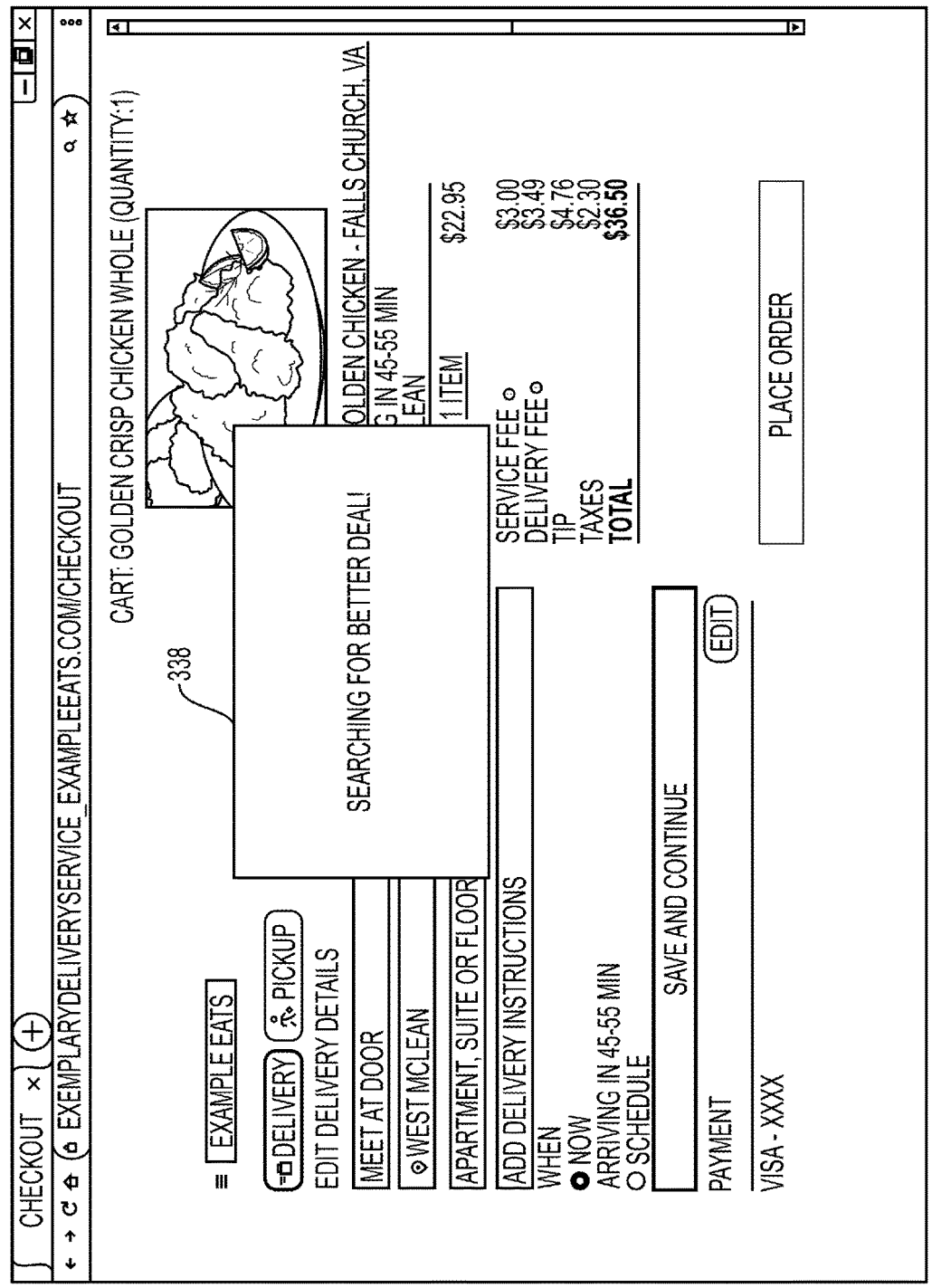

If the redirection engine 108 determines that the entity website is mapped based on the entity and a mapping of entities to entity websites, the redirection engine 108 may perform a navigation process to interact with the entity website. The navigation process may include steps 230 and 235 according to some embodiments. In step 230, the redirection engine 108 may interact with the entity website to navigate a particular entity webpage. In step 235, the redirection engine 108 may perform a second DOM analysis on the particular entity webpage to extract second data from DOM element(s) of the particular entity webpage corresponding to the at least one of the particular DOM element(s). In some embodiments, the redirection engine 108 may display a notification 338 to the user, as shown in FIG. 3B, once the redirection engine 108 determines that a website associated with Golden Chicken exists based on the mapping of entities to entity websites. In some embodiments, the user may choose to close the displayed notification 338. In such embodiments, the redirection engine 108 may abort the navigation process and continue to monitor the browser session as shown in step 205

Figure 3C:
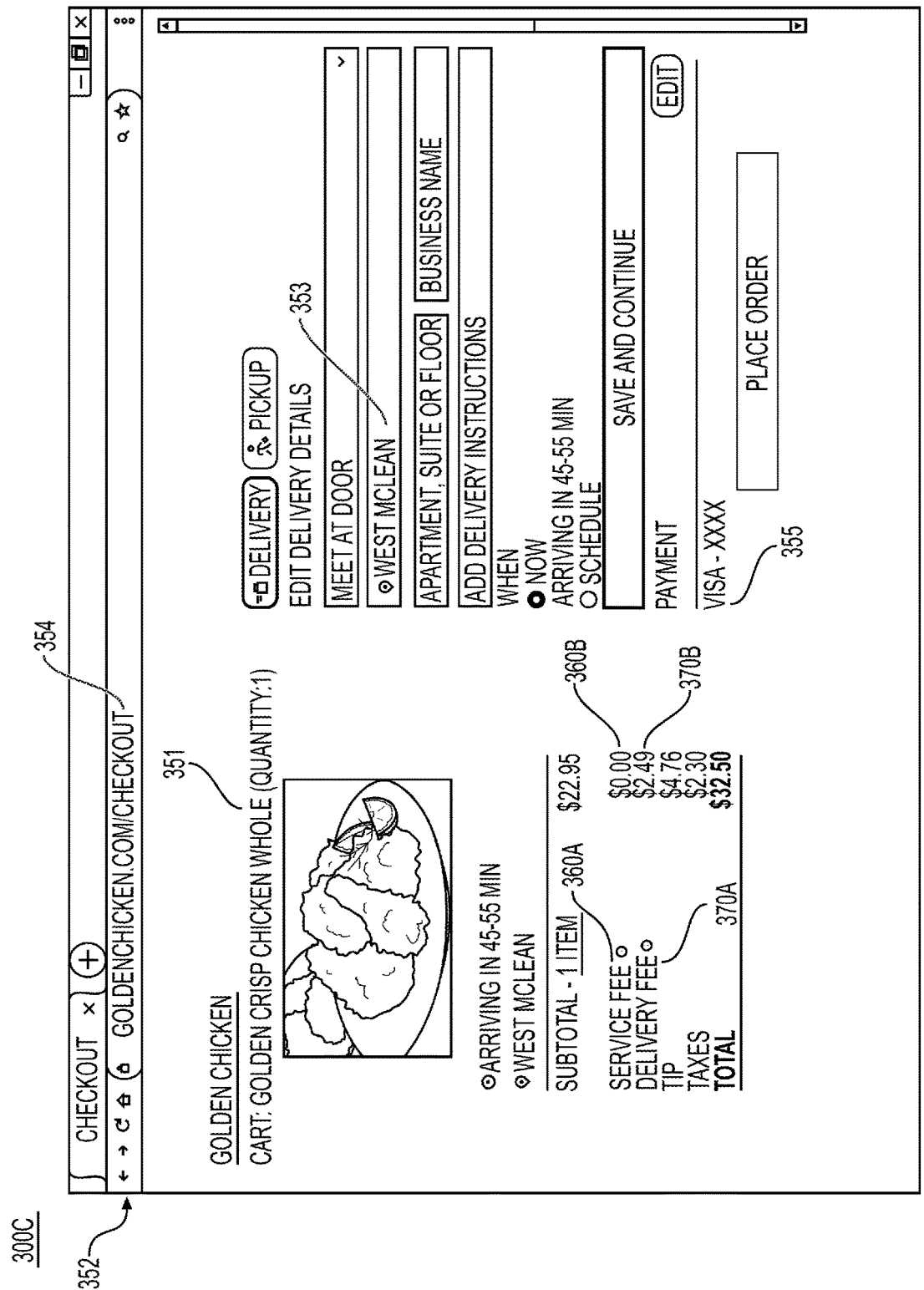

In some embodiments, the redirection engine 108 may perform steps 230 and 235 while the notification 338 is being displayed to the user. In other words, the navigation process performed by the redirection engine 108 may be hidden from the user. For example, the redirection engine 108 may utilize a hidden inline frame (also referred to as an "iframe") to perform the navigation process on the particular entity webpage. For example, the redirection engine 108 may interact with the Golden Chicken website 352 using a hidden iframe to navigate the Golden Chicken website 352 and arrive at a particular webpage (e.g., resource submission webpage URL 354 of the Golden Chicken website 352), as shown in FIG. 3C. In some embodiments, the redirection engine 108 may populate the particular webpage with information from the third party website. For example, item information 351, address information 353, and/or payment information 355 may be retrieved from the third party webpage and input in the appropriate locations on the entity website as shown in FIG. 3C. The redirection engine 108 may then perform the second DOM analysis on the webpage to extract the second data, as will be described in further detail below. In some embodiments, the extracted second data may include a first type of charge 360A and a first charged amount 360B and/or a second type of charge 370A and a second charged amount 370B. It is understood that the first type of charge 360A on the provider website may correspond to the first type of charge 310A on the third party website. Similarly, the second type of charge 370A on the provider website may correspond to the second type of charge 320A on the third party website.

In some embodiments, step 235 may include: obtaining an entity webpage document for the particular entity webpage; parsing the entity webpage document to extract second CSS elements and second HTML elements; determining whether the second CSS elements or the second HTML elements include one or more entity DOM elements that correspond to the one or more DOM element types; and extracting the second data from the one or more entity DOM elements in response to determining the second CSS elements or the second HTML elements include the one or more entity DOM elements.

In step 240, the redirection engine 108 may perform a comparison analysis on the first data and the second data to determine whether at least one difference is present. In some embodiments, step 240 may include: extracting, from the first data, a first set of values for each of the one or more DOM element types; extracting, from the second data, a second set of values for each of the one or more DOM element types that are present in the second data; and comparing the first set of values to the second set of values to determine whether the at least one difference is present. For example, the redirection engine may determine whether there is a difference between the first value (e.g., first charged amount 360B) on the provider website and the first value (e.g., first charged amount 310B) on the third party website and/or whether there is a difference between the second value (e.g., second charged amount 370B) on the provider website and the second value (e.g., second charged amount 320B) on the third party website. If the redirection engine 108 determines that there is no difference between the first data and the second data, the redirection engine 108 may terminate the interaction with the entity website as shown in step 250.

Figure 3D:
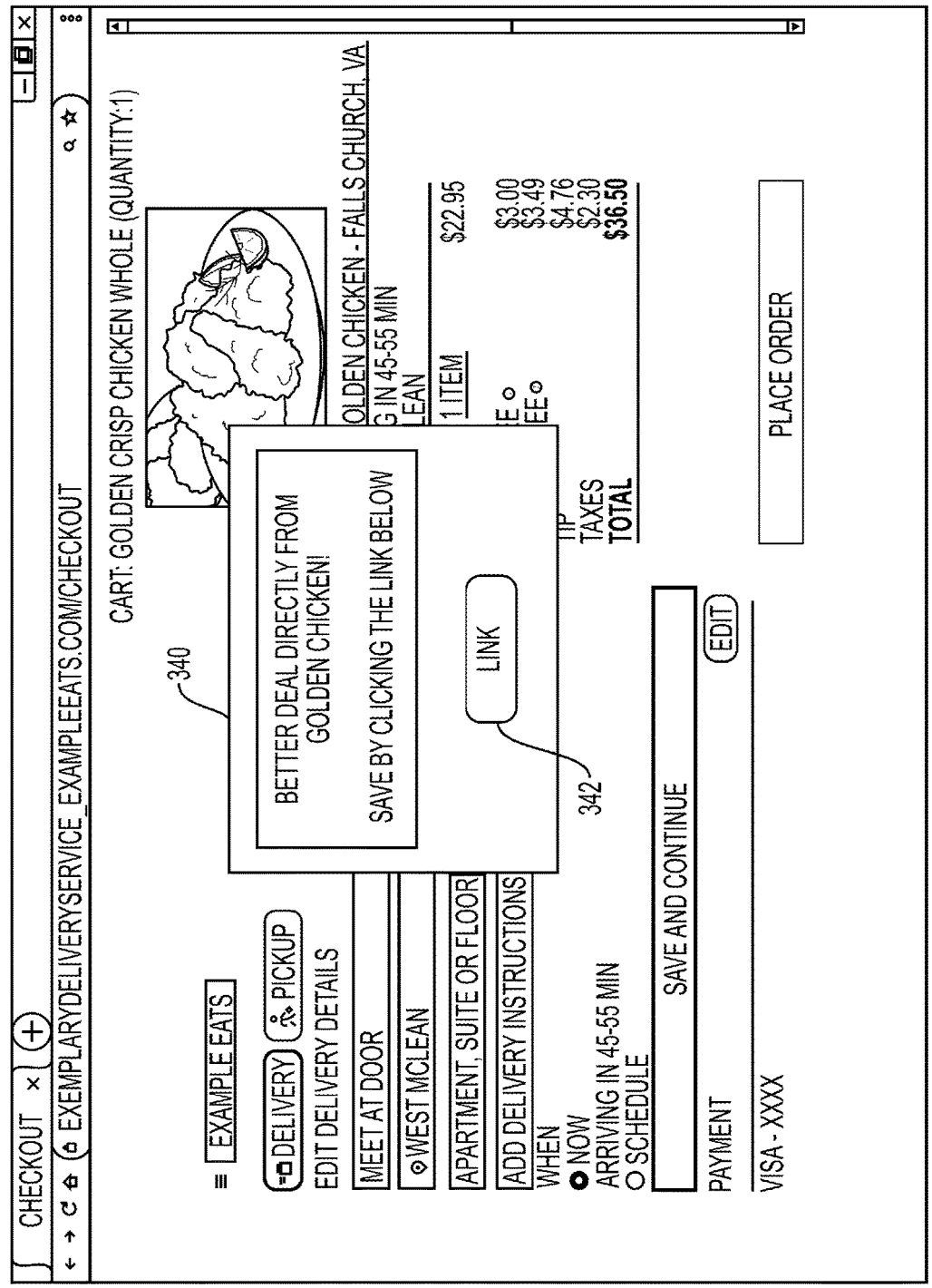

If the redirection engine 108 determines that there is at least one difference between the first data and the second data, the method 200 may move on to step 245 in which the redirection engine 108 may display a menu including a summary of the at least one difference and a link to the entity website or the particular entity webpage. In some embodiments, the redirection engine 108 may perform one or more additional steps prior to displaying the menu in step 245. In such embodiments, the redirection engine 108 may determine whether the at least one difference corresponds to a first value of the first set of values (e.g., first charged amount 310B and/or second charged amount 320B) being greater than a corresponding value of the second set of values (e.g., first charged amount 360B and/or second charged amount 370B); and display the menu in response to determining the at least one difference corresponds to the first value of the first set of values being greater than the corresponding value of the second set of values. For example, as shown in FIG. 3D, the redirection engine 108 may display a menu 340 including a link 342 to the entity website (e.g., Golden Chicken website 352) based on a determination that the first value (e.g., first charged amount 310B) and/or second value (e.g., second charged amount 320B) on the third party website exceeds the corresponding first value (e.g., first charged amount 360B) and/or second value (e.g., second charged amount 370B) on the entity website.

In some embodiments, method 200 may include an additional step in which the redirection engine 108 may receive a user input selecting the link included in the displayed menu. In such embodiments, the redirection engine 108 may launch the entity website or the particular entity webpage to be displayed to the user. For example, the redirection engine 108 may launch the Golden Chicken website 352 and/or the webpage depicted in FIG. 3C based on a determination that the user has selected the displayed link 342 as shown in FIG. 3D. In some embodiments, the launched entity website or the particular entity webpage may be populated by the redirection engine 108 with information (e.g., the item information 351, the address information 353, and/or payment information 355) from the third party webpage. Accordingly, the user may readily appreciate the convenience of not having to manually look up and re-enter the information previously provided on the third party webpage.

Figure 4:
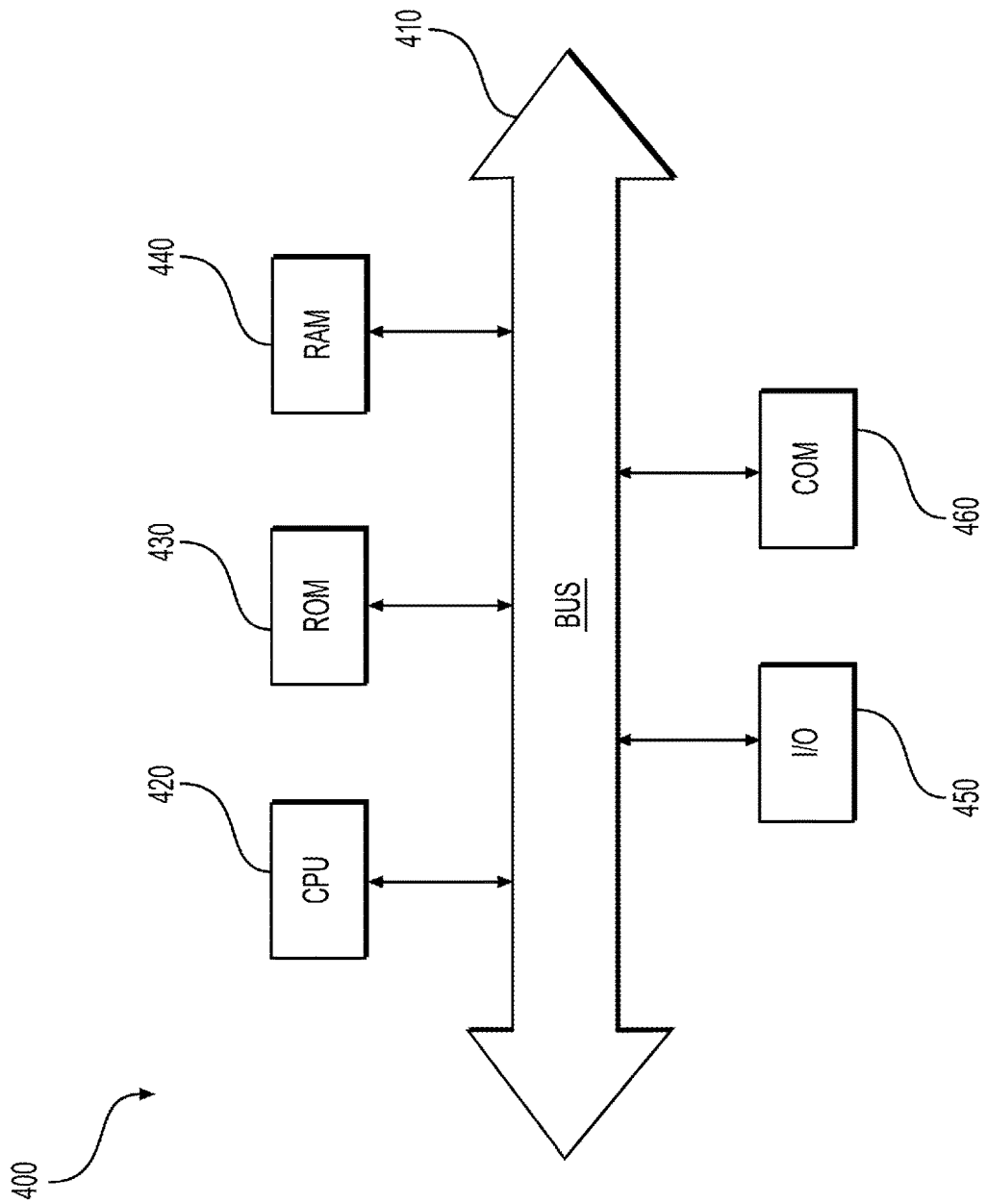
FIG. 4 depicts an example system that may execute techniques presented herein.

FIG. 4 depicts an example system that may execute techniques presented herein. FIG. 4 is a simplified functional block diagram of a computer that may be configured to execute techniques described herein, according to exemplary embodiments of the present disclosure. Specifically, the computer (or "platform" as it may not be a single physical computer infrastructure) may include a data communication interface 460 for packet data communication. The platform may also include a central processing unit ("CPU") 420, in the form of one or more processors, for executing program instructions. The platform may include an internal communication bus 410, and the platform may also include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method comprising:
   determining that a user is interacting with at least one third party website of a plurality of predetermined third party websites, wherein each of the third party websites of the plurality of predetermined third party websites is associated with a respective third party and allows a user to order from one or more entities different from each of the respective third parties;
   in response to determining that the user is interacting with at least one predetermined third party website, determining that one or more particular document object model (DOM) element(s) is present on the at least one predetermined third party website;
   in response to determining that the one or more particular DOM element(s) is present, extracting an entity and first data from at least one of the particular DOM element(s);
   identifying an entity website with a domain corresponding to the entity;
   in response to identifying the entity website, navigating to a particular entity webpage of the entity website,
   extracting second data from DOM element(s) of the particular entity webpage; and
   in response to extracting the second data, causing display of a comparison of the first data and second data.

2. The computer-implemented method of claim 1, wherein the first data includes a first price and the second data includes a second price.

3. The computer-implemented method of claim 1, wherein determining that a user is interacting with at least one third party website includes parsing the third party website and identifying a DOM element indicative of a third party associated with the third party website.

4. The computer-implemented method of claim 1, further comprising:
   determining, based on at least a portion of a URL of the third party website, that the user is interacting with a checkout webpage of the third party website.

5. The computer-implemented method of claim 1, wherein the first data includes a first value for a first data type, the method further comprising:
   determining whether the first value exceeds a first threshold;
   wherein causing display of the comparison is conditional on the first value exceeding the first threshold.

6. The computer-implemented method of claim 5, wherein the first data includes a second value for a second data type, the method further comprising:
   determining whether the second value exceeds a second threshold;
   wherein causing display of the comparison is conditional on the second value exceeding the second threshold.

7. The computer-implemented method of claim 1, wherein navigating to the particular entity webpage includes utilizing a hidden inline frame.

8. The computer-implemented method of claim 1, further comprising:
   populating the particular entity webpage with information from the at least one third party website, the information including one or more of item information, address information, and payment information.

9. A non-transitory computer-readable storage medium storing program instructions that are computer-executable to implement operations comprising:
   determining that a user is interacting with at least one third party website of a plurality of predetermined third party websites, wherein each of the third party websites of the plurality of predetermined third party websites is associated with a respective third party and allows a user to order from one or more entities different from each of the respective third parties;
   in response to determining that the user is interacting with at least one predetermined third party website, determining that one or more particular DOM element(s) is present on the at least one predetermined third party website;
   in response to determining that the one or more particular DOM element(s) is present, extracting an entity and first data from at least one of the particular DOM element(s);
   identifying an entity website with a domain corresponding to the entity;
   in response to identifying the entity website, navigating to a particular entity webpage of the entity website,
   extracting second data from DOM element(s) of the particular entity webpage; and
   in response to extracting the second data, causing display of a comparison of the first data and second data.

10. The non-transitory computer-readable storage medium of claim 9, wherein the first data includes a first price and the second data includes a second price; and
   wherein the comparison includes a difference between the first price and the second price.

11. The non-transitory computer-readable storage medium of claim 9, wherein determining that a user is interacting with at least one third party website includes parsing the third party website and identifying a DOM element indicative of a third party associated with the third party website.

12. The non-transitory computer-readable storage medium of claim 9, the operations further comprising:
   determining, based on at least a portion of a URL of the third party website, that the user is interacting with a checkout webpage of the third party website.

13. The non-transitory computer-readable storage medium of claim 9, wherein the first data includes a first value for a first data type, the operations further comprising:
   determining whether the first value exceeds a first threshold;
   wherein causing display of the comparison is conditional on the first value exceeding the first threshold.

14. The non-transitory computer-readable storage medium of claim 9, wherein the first data includes a second value for a second data type, the operations further comprising:
   determining whether the second value exceeds a second threshold;
   wherein causing display of the comparison is conditional on the second value exceeding the second threshold.

15. The non-transitory computer-readable storage medium of claim 9, wherein navigating to the particular entity webpage includes utilizing a hidden inline frame.

16. The non-transitory computer-readable storage medium of claim 9, populating the particular entity webpage with information from the at least one third party website, the information including one or more of item information, address information, and payment information.

17. A system comprising:
   one or more memories storing instructions; and
   one or more processors operatively connected to the one or more memories, the one or more processors configured to execute the instructions to:
      determine that a user is interacting with at least one third party website of a plurality of predetermined third party websites, wherein each of the third party websites of the plurality of predetermined third party websites is associated with a respective third party and allows a user to order from one or more entities different from each of the respective third parties;
      in response to determining that the user is interacting with at least one predetermined third party website, determine that one or more particular DOM element(s) is present on the at least one predetermined third party website;
      in response to determining that the one or more particular DOM element(s) is present, extract an entity and first data from at least one of the particular DOM element(s);
      identify an entity website with a domain corresponding to the entity;
      in response to identifying the entity website, navigate to a particular entity webpage of the entity website;
      extract second data from DOM element(s) of the particular entity webpage; and
      in response to extracting the second data, cause display of a comparison of the first data and second data.

18. The system of claim 17, wherein the one or more processors are further configured to:
   determine whether there is at least one difference between the first data and the second data; and
   in response to a determination that at least one difference is not present, terminate an interaction with the entity website.

19. The system of claim 17, wherein the one or more processors are further configured to:
   determine whether there is at least one difference between the first data and the second data; and
   in response to a determination that at least one difference is present, cause display of a link to the entity website to the user.

20. The system of claim 19, wherein the one or more processors are further configured to:
   in response to a user input, launch the entity website and populate the entity website with information from the at least one predetermined third party website, the information including one or more of item information, address information, and payment information.

* * * * *